United States Patent Office 3,014,029
Patented Dec. 19, 1961

3,014,029
18-OXYGENATED STEROIDS AND PROCESS FOR THEIR MANUFACTURE
Oskar Jeger, Zurich, Switzerland, assignor to Ciba Pharmaceutical Products Inc., Summit, N.J.
No Drawing. Filed June 16, 1959, Ser. No. 820,599
Claims priority, application Switzerland June 18, 1958
23 Claims. (Cl. 260—239.55)

The present invention relates to a process for the manufacture of new 18-oxygenated steroids.

The invention relates more especially to a process wherein 18:20-cyclo-20-hydroxy-pregnane compounds are dehydrated and in the resulting $\Delta^{18:20}$-pregnene compounds the 18:20-double bond is oxidatively split up. The process is illustrated by the following diagram of partial formulae:

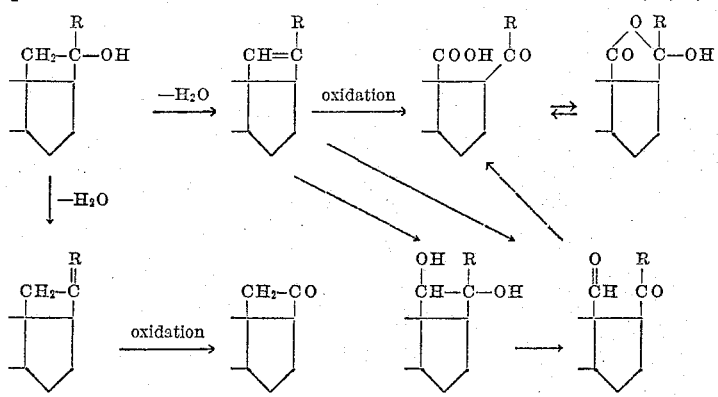

Depending on the oxidation agents used, the products of the process are either 18:20-dihydroxy-18:20-cyclopregnane compounds or 18:20-dioxo-pregnane compounds or 20-oxo-pregnane-18-acids. They have the following constitution in the rings C and D

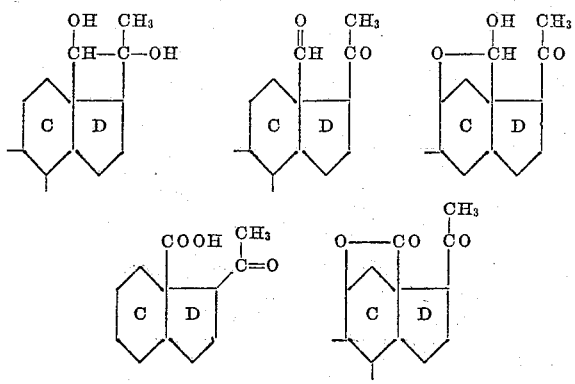

and are important starting materials for the synthesis of physiologically active 18-oxygenated pregnane compounds, such as for example aldosterone. Of particular importance for the synthesis of aldosterone are the following two compounds

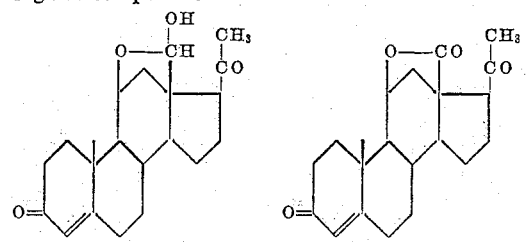

The conversion of these compounds into aldosterone may be effected for instance by incubation with a fungus of the species *Ophiobolus herpotrichus* or *Sclerotinia fructicola* and, when starting from the second compound, by reduction of the lactone group according to published methods. The products of the process may, however, be physiologically active themselves; thus, for example, the compounds corresponding to the last formula have an anabolic activity.

The 18:20-cyclo-20-hydroxy-pregnane-compounds of the 5α- and 5β-series can be obtained as described in the process of the patent application Serial No. 820,595, filed June 16, 1959, by Oskar Jeger.

In addition to the substituents mentioned in rings C and D the products of the process may also contain further substituents, such as free or functionally converted hydroxyl or oxo groups, halogen atoms, alkyl groups, such as methyl groups, for example in positions 1, 2, 3, 4, 5, 6, 7, 8, 9, 11, 12, 14, 15, 16, 17, 19 and 21. They may be saturated in the ring system or contain double bonds, for example, in one or more of the positions 4, 5, 9 (11), 11, 14 or 16. By functionally converted hydroxyl or oxo groups respectively are meant esterified or etherified hydroxyl groups, or ketalized or enolized oxo groups, or oximes, hydrazones, semicarbazones.

A product of the present process that contains free hydroxyl and/or oxo groups can be converted in the known manner into a functional derivative thereof, such as an ester, ether, enol ester, enol ether, acetal, a corresponding thio derivative (such as thio-ether, thio-acetal or ester of a thio-acid), or into a hydrazone or oxime thereof. The acid radical in the esters and enol esters are those of saturated or unsaturated aliphatic, cycloaliphatic, aromatic or heterocyclic monocarboxylic or dicarboxylic acids, preferably those having from 2 to 8 carbon atoms or of sulfonic acid, or of phosphoric, sulfuric or hydrohalic acids. The radicals in the ethers, enol ethers, acetals or in the corresponding thioderivatives may belong to the aliphatic, aromatic or heterocyclic series; such radicals are, for example, lower alkyl or alkylene groups such as methyl, ethyl, propyl, ethylene, propylene groups or lower aralkyl groups such as benzyl-, diphenyl- or triphenyl-methyl groups, further tetrahydropyranyloxy groups or sugar radicals such as those of glucose, galactose or maltose.

For the conversion of the 18:20-cyclo-20-hydroxy-steroids into 18-oxygenated steroids water is eliminated in the first reaction step. This is achieved by means of a dehydrating agent such as thionyl chloride, phosphorus oxychloride, methanesulfonyl chloride or the like, in the presence of a substance of basic reaction such as pyridine, collidine or the like. Alternatively, water can be eliminated by treatment with a mixture of pyridine and bromacetamide or bromsuccinimide and subsequent treatment with sulfur dioxide or by conversion into 20-O-acyl derivatives and by pyrolysis. 20-sulfonic acid ester groups (for example tosylates or mesylates) can be eliminated by reaction with a solution of lithium chloride in dimethyl formamide. Water can also be eliminated with the aid of an acid silicate, such as fuller's earth. The products resulting from the elimination of water are $\Delta^{18:20}$-18:20-cyclopregnenes and $\Delta^{20:21}$-18:20-cyclopregnenes.

The splitting up of the 18:20 double bond is carried out in the manner known for the oxidative cleavage of double bonds. The ozonides obtained by treatment with ozone are split by application of a reducing agent, such as zinc and acetic acid. Alternatively, the double bond can be hydroxylated, for example by reaction with a molar proportion of osmium tetroxide, the glycol thus formed being split up by means of per-iodic acid, lead tetraacetate or sodium bismuthate. The double bond can also be split up by performing the oxidation with an alkali metal per-iodate, for example sodium per-iodate in the presence of a catalytic amount of osmium tetroxide with the addition of an alkali metal salt of a carboxylic acid such as potassium acetate, in an aqueous medium.

The following examples illustrate the invention:

Example 1

500 mg. of 3β-acetoxy-20-hydroxy-18:20-cyclo-allopregnane are refluxed in a mixture of 10 cc. of acetanhydride and 10 cc. of glacial acetic acid for 1 hour, and the product, from which water now has been eliminated and which is unsaturated towards tetranitromethane (consisting of a mixture of $\Delta^{18:20}$- and $\Delta^{20:21}$-18:20-cyclo-3β-acetoxy-allopregnene), is dissolved in 50 cc. of methylene chloride, and the solution at —40° C. is treated with an ozone current of 1% strength until a sample thereof no longer gives a color reaction with tetranitromethane. The solvent is then cautiously evaporated in vacuo at room temperature, the ozonide is dissolved in 50 cc. of absolute alcohol and subjected to reductive cleavage in the presence of 100 mg. of 10% paladium-calcium carbonate catalyst. On cautious oxidation with potassium permanganate, chromic acid or silver oxide the resulting 3β-acetoxy-18:20-dioxo-allopregnane yields the 3β-acetoxy-20-oxo-allopregnane-18-acid which can alternatively be prepared by subjecting the ozonide to direct oxidative cleavage with chromic acid in glacial acetic acid solution or with hydrogen peroxide in glacial acetic acid.

Example 2

600 mg. of 18→20-cyclo-3β-acetoxy-20ξ-hydroxy-allopregnane are dissolved in 3 cc. of pyridine, mixed at —40° C. with 1.355 grams of freshly distilled thionyl chloride in 4 cc. of pyridine, and the mixture is left to itself for 5 hours at 0° C. The yellowish brown reaction solution is poured over ice and extracted with ether+methylene chloride. The organic layers are washed three times with 2 N-hydrochloric acid, three times with icecold 2 N-potassium carbonate solution and four times with water, to yield 585 mg. of a pale brown oil. Tetranitromethane test: positive. Infrared spectrum in carbon tetrachloride: 1730 cm.$^{-1}$ and 1245 cm.$^{-1}$ (acetate), no hydroxyl band, no typical double bond bands. Chromatography of this oil on 19 grams of alumina and elution with petroleum ether+benzene (2:1) gives in fractions 1–4 159 mg. of a colorless oil, all of which fractions turn yellow with tetranitromethane. The fractions 2 and 3 (151 mg.) crystallize after a short time and yield after two recrystallizations from hexane+methanol needles melting at 90–92° C. Beilstein test: negative. Ultraviolet spectrum: no bands. On recrystallization from ethanol, $\Delta^{18:20}$ - 18→20 - cyclo - 3β - acetoxy - allopregnene melts at 95° C.; optical rotation $$[\alpha]_D^{20} = +34 \pm 3° \quad (c. = 0.874)$$

Fractions 7–10, eluted with benzene, yield 261 mg. of a spontaneously crystallizing compound. After recrystallization from methylene chloride+methanol crystals melting at 176–178° C. are obtained. Tetranitromethane test: negative. Infrared spectrum in carbon tetrachloride: 1730 cm.$^{-1}$ and 1245 cm.$^{-1}$ (acetate); no hydroxyl band.

For analysis the product is recrystallized four times from methylene chloride+ethanol (M.P. 186° C.) and dried for 10 hours at 80° C. in a high vacuum. $C_{46}H_{70}O_7S$. Found: C 72.15%, H 9.10%; calculated: C 72.02, H 9.20. Optical rotation $[\alpha]_D^{20} = +5°$ (c. = 0.631). The product is the ester

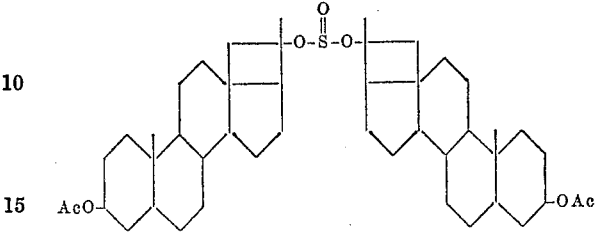

Example 3

The $\Delta^{18:20}$ - 3β - acetoxy - 18:20 - cyclo - allopregnene obtained as described in Example 2 can also be prepared from 3β-acetoxy-20ξ-hydroxy-18:20-cyclo-allopregnane (300 mg.) by treatment with 4.5 grams of phosphorus oxychloride in the presence of 5 grams of pyridine for 2 hours on a water bath. After working up, 281 mg. of crude product are obtained which is chromatographed on a column of 9 grams of aluminium oxide (activity II). With petroleum ether there are obtained from the column 205 mg. of substance melting at 88–90° C; optical rotation $[\alpha]_D = +43°$ (in chloroform).

Example 4

100 mg. of $\Delta^{18:20}$-18→20-cyclo-3β-acetoxy-allopregnene are ozonized in 10 cc. of ethyl acetate at —70° C. 20 cc. of water and 4 cc. of hydrogen peroxide of 30% strength are added, and the mixture is refluxed for 2½ hours. The reaction solution is poured into water and extracted with ether. The ethereal extract is thoroughly washed with water and with slightly acidified ferrous sulfate solution. The resulting product (112 mg. of a colorless oil) is dissolved in 8 cc. of methanolic potassium hydroxide solution of 5% strength and heated for 1 hour at 45–50° C. (the oil turns slightly yellowish). After cooling, dilute potassium hydroxide solution is added and the mixture extracted with ether. Working up yields 25 mg. of a neutral product (a colorless oil) and 68 mg. of an acid product (a yellow oil) which is chromatographed on silica gel. A 20:1 mixture of benzene+ether elutes 27 mg. of 3β-hydroxy-20-oxo-5α-pregnane-18-acid. Infrared spectrum in carbon tetrachloride: 3440 cm.$^{-1}$ (hydroxyl band; weak), 1775 cm.$^{-1}$ (pseudo acid; very strong), 1710 cm.$^{-1}$ (C–20-ketone band; weak); pK=8.80.

Example 5

$\Delta^{18:20}$-18→20-cyclo-3β-acetoxy-allopregnene (265 mg.), of M.P. 91–91.5° C., optical rotation $[\alpha]_D^{20} = +34°$ (c. = 0.740), is purified chromatographically, twice recrystallized, dissolved in 18 cc. of absolute ether and mixed with 220 mg. of osmium tetroxide in 5 cc. of ether. A brown precipitate (osmium ester) is formed immediately. 0.1 cc. of pyridine is added and the reaction mixtur kept for 2 days in the dark. The solution is evaporated to dryness in vacuo, benzene is added, and the whole is again evaporated. This operation is repeated until the odor of pyridine has disappeared. The residue is dissolved in 30 cc. of absolute benzene and added dropwise to 600 mg. of lithium aluminum hydride in 20 cc. of absolute ether. After completion of the dropwise addition the mixture is refluxed for 5 hours. The lithium aluminum hydride is destroyed with ethyl acetate. The whole is diluted with water, acidified with 2 N-sulfuric acid, and the liquid decanted from the precipitated osmic acid. The hydroxylation product is taken up in ether and washed with 2 N-sulfuric acid and 2 N-potassium carbonate solution. The resulting pale-yellowish oil (255 mg.)—infrared spectrum in Nujol: strong hydroxyl band at 3350 cm.$^{-1}$—is filtered through 20 times its own weight of alumina. The first fraction (225 mg.) is recrystallized from methylene chloride+acetone+hexane, to yield 112 mg. of poorly developed crystals melting at 200–202° C. (Product A), being 18→20-cyclo-3β:18:20ξ-trihydroxy-allopregnane. The mother liquor is slightly evaporated in vacuo and kept overnight at 5° C., to yield 60 mg. of fine needles melting at 181° C. (Product B) which, after crystallization from methylene chloride+acetone+hexane melt at 183° C. Infrared spectrum in Nujol: strong hydroxyl band at 3320 cm.$^{-1}$ (spectrum is similar to that of the crude product); optical rotation $[\alpha]_D^{20}=+13°$ (c.=0.776). Product B is an isomeric 18→20-cyclo-3β:18:20ξ-trihydroxy-allopregnane. The mother liquor is evaporated to dryness in vacuo (Product C).

*Example 6*

109 mg. of 18→20-cyclo-3β:18:20ξ-trihydroxy-allopregnane (Product A) are dissolved in 25 cc. of glacial acetic acid and mixed with 162 mg. of lead tetraacetate (1.1 mols) in 6 cc. of glacial acetic acid. 1 cc. chloroform is added and the mixture heated to 40° C. and kept overnight at room temperature. The solution is then heated for 6 hours at 40–50° C., poured into ice-water and extracted with ether. The ethereal layers are washed 12 times with water. The acid constituents are extracted with 3 N-potassium hydroxide solution. Separation produces 86 mg. of a neutral product and 18 mg. of an acid product. Neutral product: infrared spectrum in chloroform: 3600 and 3450 cm.$^{-1}$ (hydroxyl band), 1765 cm.$^{-1}$ and 1723 cm.$^{-1}$.

60 mg. of the neutral product obtained by oxidation with lead tetraacetate of Product C (Example 5) are chromatographed on 1.2 grams of alumina. 50 cc. of 1:1 petroleum ether+benzene elute 28 mg. of a colorless oil which cannot be oxidized with potassium permanganate; its elution with ether+methanol yields 8 mg. of 18→20-cyclo-3β:18:20ξ-trihydroxy-allopregnane, identical with Product B (M.P. 182° C.).

Acid constituent: The acid constituents from the splitting up with lead tetracetate of Products A and C (Example 5) are combined (31 mg.) and chromatographed over silica gel. 1:1 benzene+methylene chloride elutes 25 mg. of 3β-hydroxy-20-oxo-allopregnane-18-acid; pK 8.70. Infrared spectrum in Nujol: bands at 1710 and 1735 cm.$^{-1}$.

*Example 7*

For the purpose of eliminating water, 1 gram of 18:20-cyclo-Δ$^5$-3-ethylenedioxy-20ξ-hydroxy-11-oxopregnene is dissolved in 200 cc. of absolute xylene, and the boiling solution is mixed with 2.5 grams of fuller's earth which has previously been activated by heating for 5 hours in a water-jet vacuum at 330° C. The mixture is refluxed for 3 hours, another 2.5 grams of fuller's earth are added, and the mixture is refluxed for a further 3 hours. The fuller's earth is then filtered off, the filtrate evaporated to dryness in a water-jet vacuum, and the residue is treated in the known manner with ethylene glycol and para-toluenesulfonic acid if the ultraviolet absorption spectrum displays a band at 240 mμ, log ε >3.0. The water-elimination product is easy to purify by dissolving it in benzene and filtering this solution through a column of 30 grams of alumina, to yield 590 mg. of crystalline 18→20-cyclo-Δ$^{5:18\cdot20}$-3-ethylenedioxyl-11-oxo-pregnadiene; to reduce the carbonyl C–11 it is dissolved as it is in 25 cc. of absolute tetrahydrofuran, and the solution is mixed with 295 mg. of lithium aluminum hydride and refluxed for 3 hours with exclusion of moisture. The excess reducing agent is then destroyed with 1 cc. of ethyl acetate, the mixture is treated with 0.8 cc. of aqueous potassium hydroxide solution, the precipitated aluminum hydroxide is filtered off and thoroughly rinsed with tetrahydrofuran. The combined filtrates are extensively concentrated at 30° C. in a water-jet vacuum, mixed with water and worked up in the usual manner. To purify the neutral reaction product it is dissolved in 200 cc. of benzene and the solution is filtered through a column of 18 grams of alumina. By means of benzene a total of 478 mg. of crystalline 18→20-cyclo-Δ$^{5:18\cdot20}$-3-ethylenedioxy-11β-hydroxy-pregnadiene can be isolated which displays in the infrared spectrum a strong absorption band of the free hydroxyl at 3600 cm.$^{-1}$, but the carbonyl band has disappeared.

For conversion into 21-desoxyaldosterone 1 gram of this intermediate product is dissolved in 75 cc. of carbon tetrachloride, 0.5 cc. of pyridine is added, and the solution is treated at −65 to −75° C. with ozone until 1.2 mols of ozone have been taken up. The above solution is slowly raised to 0° C. the solvent evaporated in a high vacuum, and the residue is dissolved in 20 cc. of glacial acetic acid, treated with 1 gram of freshly activated finely granulated zinc and then heated for 1 hour at 90° C. To split up the ethylenedioxy grouping, the reaction mixture is treated with 20 cc. of water and heated for another hour at 60° C. Working up yields 810 mg. of neutral ozonisation products which are dissolved in 45 cc. of benzene and chromatographed over a column of 42 grams of alumina. 7:1 and 5:1 mixtures of benzene+ether elute from the column a total of 385 mg. of crystals which display in the ultraviolet absorption spectrum in absolute alcohol the band typical of α:β-unsaturated ketones at 240 mμ, log ε=4.21. The infrared spectrum contains the following bands: 3520 cm.$^{-1}$ (hydroxyl of the semiacetal grouping); 1720 cm.$^{-1}$ (carbonyl C–20); 1683 cm.$^{-1}$, 1635 cm.$^{-1}$ (α:β-unsaturated carbonyl grouping of ring A).

The resulting product reduces silver diamine and Fehling's solution; it is the 21-desoxyaldosterone of the formula

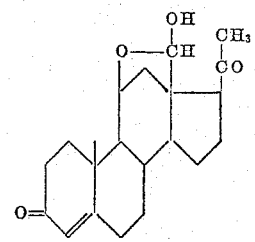

By oxidation with chromic acid+pyridine it can be oxidized to the corresponding 18→11-lactone of the formula

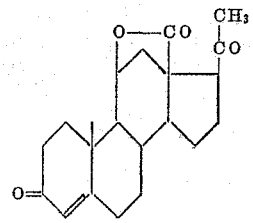

*Example 8*

By treating Δ$^5$-3-ethylenedioxy-20ξ-hydroxy-18:20-cyclo-pregnene (500 mg.) with 2 grams of thionyl chloride and 6 cc. of absolute pyridine at −45° C. and separating the reaction mixture by chromatography on aluminum oxide of activity II there are obtained:

(1) 112 mg. of Δ$^{5:18\cdot20}$-3-ethylenedioxy-18:20-cyclopregnadiene melting at 170–171° C. (from ether-methanol); optical rotation $[\alpha]_D=+35°$.

$C_{23}H_{32}O_2$:
   Calculated—C, 81.13%; H, 9.47%
   Found—C, 81.09%; H, 9.58% and (2) 305 mg. of the ester

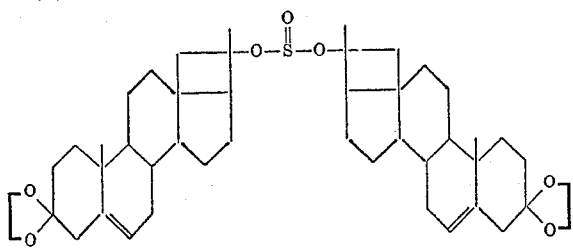

melting at 191–191.5° C. (from methylene-chloride-hexane); infrared spectrum: no hydroxyl or carbonyl bands.

$C_{46}H_{66}O_7S$:
Calculated—C, 72.42%; H, 8.72%; S, 4.20%
Found—C, 72.47%; H, 8.71%; S, 4.33%

By treating this sulfite ester with sodium methylate of 5% strength of an water bath and purifying the crude product by chromatography, $\Delta^5$-3-ethylenedioxy-20ξ-hydroxy-18:20-cyclo-pregnene is obtained; yield=80%.

*Example 9*

For the purpose of eliminating water 1 gram of $\Delta^5$-3-ethylene-dioxy-20ξ-hydroxy-21-acetoxy-18:20-cyclo-pregnene is dissolved in 50 cc. of absolute ether, 2 cc. of phosphorus oxychloride and 4 cc. of pyridine are cautiously added to the solution at −15° C. and the whole allowed to stand for 5 hours at 0° C. After working up in the usual manner, 950 mg. of an amorphous, halogen-free crude product are obtained which is chromatographed on a column of 45-grams of aluminum oxide (activity II). The column is eluted with mixtures of petroleum ether and benzene 1:1 to 1:5 and a total of 520 mg. of crystalline $\Delta^{5:18\cdot20}$-3-ethylenedioxy-21-acetoxy-18:20-cyclo-pregnadiene is obtained which is dissolved without further purification in 50 cc. of absolute carbon tetrachloride for the purpose of ozonization, and, after adding 1 cc. of pyridine at −70° C., the solution is treated with ozone until about 1.1 mols of ozone have been taken up. The oily solution is then slowly heated to +5° C., the solvent cautiously evaporated under reduced pressure, the residue dissolved in 15 cc. of glacial acetic acid, 500 mg. of freshly activated zinc grit are added to the solution and the whole is heated for one hour on a water bath. In order to split the ethylenedioxy grouping 8 cc. of water are added to the reaction mixture and the whole allowed to stand for another hour at 60° C.

After working up, there are obtained 318 mg. of neutral ozonization product which is purified by chromatography on a column of 30 grams of silica gel. The $\Delta^4$-3:18:20-trioxo-21-acetoxy-pregnene obtained in this manner exhibits in the ultraviolet spectrum the typical bands of the α:β-unsaturated ketone grouping of ring A (242 mμ, log ε=4.17 in rectified spirit). In the infrared spectrum (chloroform) there are the following bands: 2720 cm.$^{-1}$ (aldehyde C–18), 1745–1710 cm.$^{-1}$ (acetate radical C–21 and carbonyl groups C–18 and C–20) and a doublet 1683/1620 cm.$^{-1}$ ($\Delta^4$-3-ketone).

*Example 10*

For the purpose of eliminating water, 1 gram of $\Delta^5$-3-ethylenedioxy-20ξ-hydroxy-21-acetoxy-11-keto-18:20-cyclo-pregnene is dissolved in 50 cc. of absolute ether, 3 cc. of phosphorus oxychloride and 4.5 cc. of pyridine are added to the solution at −18° C. and the mixture is allowed to stand for 6 hours at 0° C. After working up, 955 mg. of crude product are obtained which are dissolved in 100 cc. of petroleum ether-benzene 1:1 and filtered through a column of 30 grams of aluminum oxide. With this solvent mixture a total of 810 mg. of crystalline $\Delta^{5:18\cdot20}$-3-ethylenedioxy-21-acetoxy-11-keto-18:20-cyclo-pregnadiene are eluted from the column and dissolved without further purification in 25 cc. of absolute methanol and reduced at the boil with 200 mg. of sodium boron hydride. After working up and purifying by chromatography on a column of 50 grams of silica gel, crystalline $\Delta^{5:18\cdot20}$-3-ethylenedioxy-11β-hydroxy-21-acetoxy-18:20-cyclo-pregnadiene (625 mg.) is obtained.

This intermediate product can be converted into aldosterone-21-acetate in the following manner: 1 gram of substance dissolved in 100 cc. of absolute carbon tetrachloride and 1 cc. of absolute pyridine is ozonized at −75° C. until 1.2 mols of ozone have been taken up. The solvent is then cautiously evaporated at 0° C. under reduced pressure, the amorphous ozonide dissolved in 20 cc. of ethyl acetate and, after adding 1 gram of a palladium-calcium carbonate catalyst of 5% strength, split by reduction. There is obtained $\Delta^5$-3-ethylenedioxy-11β-hydroxy-21-acetoxy-18:20-dioxo-pregnene which, after being heated for a short time at 80° C. with acetic acid of 90% strength, is split to form aldosterone-21-acetate.

*Example 11*

For the purpose of eliminating water, $\Delta^5$-3-ethylenedioxy-20ξ-hydroxy-11β-acetoxy-18:20-cyclo-pregnene is treated at a low temperature with phosphorus oxychloride and pyridine and the resulting $\Delta^{5:18\cdot20}$-3-ethylenedioxy-11β-acetoxy 18:20-cyclo-pregnadiene reduced with lithium aluminum hydride in absolute tetrahydrofuran. After these operations $\Delta^{5:18\cdot20}$-3-ethylenedioxy-11β-hydroxy-18:20-cyclo-pregnadiene described in Example 7 is obtained.

What is claimed is:
1. The $\Delta^{18:20}$-18:20-cyclo-3β-acetoxy-allopregnene.
2. The $\Delta^{5:18\cdot20}$-18:20-cyclo-3-ethylenedioxy-pregnadiene.
3. The $\Delta^{5:18\cdot20}$-18:20-cyclo-3-ethylenedioxy-11-oxo-pregnadiene.
4. The $\Delta^{5:18\cdot20}$-18:20-cyclo-3-ethylenedioxy-11β-hydroxy-pregnadiene.
5. The $\Delta^{5:18\cdot20}$-18:20-cyclo-3-ethylenedioxy-11β-acetoxy-pregnadiene.
6. The $\Delta^{5:18\cdot20}$-18:20-cyclo-3-ethylenedioxy-11β-hydroxy-21-acetoxy-pregnadiene.
7. The $\Delta^{5:18\cdot20}$-18:20-cyclo-3-ethylenedioxy-11-oxo-21-acetoxy-pregnadiene.
8. The $\Delta^{5:18\cdot20}$-18:20-cyclo-3-ethylenedioxy-21-acetoxy-pregnadiene.
9. The 18:20-cyclo-3β,18,20-trihydroxy-allogpregnane.
10. The 3β-acetoxy-18:20-dioxo-allopregnane.
11. The 3β-acetoxy-20-oxo-allopregnane-18-acid.
12. The 3β-hydroxy-20-oxo-allopregnane-18-acid.
13. Process for the manufacture of $\Delta^{18\cdot20}$-pregnene compounds, which comprises dehydrating a member selected from the group consisting of an 18:20-cyclo-20-hydroxy-pregnane unsubstituted in the 18- and 21-positions, and a derivative thereof unsaturated in the nucleus, by means of a member selected from the group consisting of a halide of sulfurous acid, phosphoric acid and of an organic sulfonic acid in the presence of a tertiary organic nitrogen base.
14. Process for the manufacture of $\Delta^{18\cdot20}$-pregnene compounds, which comprises dehydrating a member selected from the group consisting of an 18:20-cyclo-20-hydroxy-pregnane unsubstituted in the 18- and 21-positions, and a derivative thereof unsaturated in the nucleus, by heating with a member selected from the group consisting of an anhydride of an organic carboxylic acid, and a mixture thereof with such an acid.
15. Process for the manufacture of $\Delta^{18\cdot20}$-pregnene compounds, which comprises esterifying a member selected from the group consisting of an 18:20-cyclo-20-hydroxy-pregnane, and a derivative thereof unsaturated in the nucleus, with a member selected from the group consisting of an acid anhydride and an acid chloride in the presence of a tertiary organic base, and splitting the resulting 20-O-acyl derivative by heating to form an 18:20-cyclo-$\Delta^{18\cdot20}$-pregnene derivative.

16. Process for the manufacture of $\Delta^{18:20}$-pregnene compounds, which comprises dehydrating a member selected from the group consisting of an 18:20-cyclo-20-hydroxy-pregnane unsubstituted in the 18- and 21-positions, and a derivative thereof unsaturated in the nucleus, by treatment with fuller's earth.

17. Process for the manufacture of 18-oxygenated pregnane compounds, which comprises treating a member selected from the group consisting of a $\Delta^{18:20}$-pregnane which is unsubstituted in the 18- and 21-positions, and a derivative thereof unsaturated in the nucleus, with ozone and splitting the resulting ozonide by means of a reducing agent.

18. Process for the manufacture of 18-oxygenated pregnane compounds, which comprises treating a member selected from the group consisting of a $\Delta^{18:20}$-pregnane which is unsubstituted in the 18- and 21-positions, and a derivative thereof unsaturated in the nucleus, with osmium tetroxide, then treating the resulting product with a member selected from the group consisting of lead tetraacetate, per-iodic acid and sodium bismuthate.

19. A member selected from the group consisting of $\Delta^{18:20}$-18:20-cyclo-pregnenes having the formula

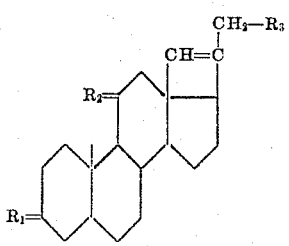

and the corresponding compounds which contain a double bond starting from carbon atom 5, in which formula $R^1$ stands for a member of the group consisting of oxo and ethylenedioxy, $R^2$ for a member of the group consisting of hydrogen, oxo, hydrogen together with lower acyloxy and $R^3$ for a member of the group consisting of hydrogen, hydroxyl and lower acyloxy.

20. A member selected from the group consisting of 18:20-dihydroxy-18:20-cyclo-pregnanes having the formula

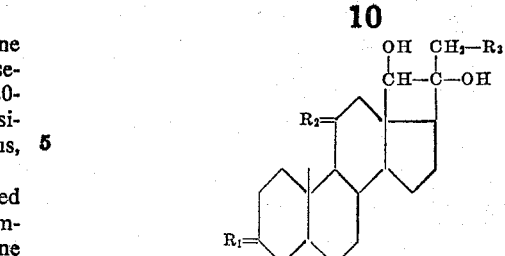

and the corresponding compounds which contain a double bond starting from carbon atom 5, in which formula $R^1$ stands for a member of the group consisting of oxo and ethylenedioxy, $R^2$ for a member of the group consisting of hydrogen, oxo, hydrogen together with hydroxy and hydrogen together with lower acyloxy and $R^3$ for a member of the group consisting of hydrogen, hydroxyl and lower acyloxy.

21. Process for the manufacture of $\Delta^{18:20}$-pregnene compounds, which comprises dehydrating wherein a member selected from the group consisting of an 18:20-cyclo-20-hydroxy-pregnane unsubstituted in the 18- and 21-positions, and a derivative thereof unsaturated in the nucleus, by means of a member selected from the group consisting of bromacetamide and bromsuccinimide in pyridine, then treating the resulting product with sulfur dioxide.

22. Process for the manufacture of $\Delta^{18:20}$-pregnene compounds, which comprises dehydrating a 20-sulfonic acid ester of a member selected from the group consisting of an 18:20-cyclo-20-hydroxy pregnane, and a derivative thereof unsaturated in the nucleus, by means of lithium chloride in dimethyl formamide.

23. Process for the manufacture of 18-oxygenated pregnane compounds, which comprises treating a member selected from the group consisting of a $\Delta^{18:20}$-pregnene which is unsubstituted in the 18- and 21-positions, and a derivative thereof unsaturated in the nucleus, with an alkali metal periodate in the presence of a catalytic amount of osmium tetroxide with the addition of an alkali metal salt of a lower alkanoic acid, in an aqueous medium.

References Cited in the file of this patent

UNITED STATES PATENTS

| | | |
|---|---|---|
| 2,778,776 | Wettstein et al. | Jan. 22, 1957 |
| 2,868,784 | Ruzicka et al. | Jan. 13, 1959 |

UNITED STATES PATENT OFFICE
CERTIFICATE OF CORRECTION

Patent No. 3,014,029            December 19, 1961

Oskar Jeger

It is hereby certified that error appears in the above numbered patent requiring correction and that the said Letters Patent should read as corrected below.

Column 9, lines 26 to 35, the formula should appear as shown below instead of as in the patent:

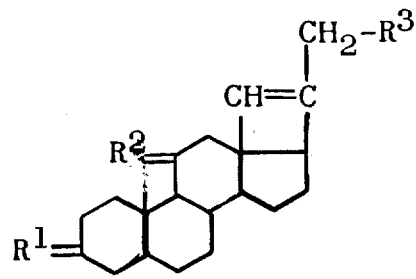

column 10, lines 1 to 10, the formula should appear as shown below instead of as in the patent:

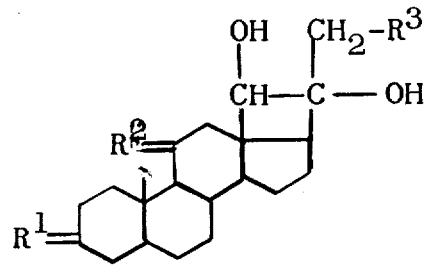

same column 10, line 20, strike out "wherein".

Signed and sealed this 4th day of September 1962.

(SEAL)
Attest:
ERNEST W. SWIDER
Attesting Officer

DAVID L. LADD
Commissioner of Patents